July 28, 1953 — R. REVENO — 2,646,912
APPARATUS FOR AND METHOD OF FILLING CAPSULES
Filed March 23, 1950 — 3 Sheets-Sheet 1

INVENTOR
Robert Reveno.
BY
ATTORNEYS.

July 28, 1953  R. REVENO  2,646,912
APPARATUS FOR AND METHOD OF FILLING CAPSULES
Filed March 23, 1950  3 Sheets-Sheet 2
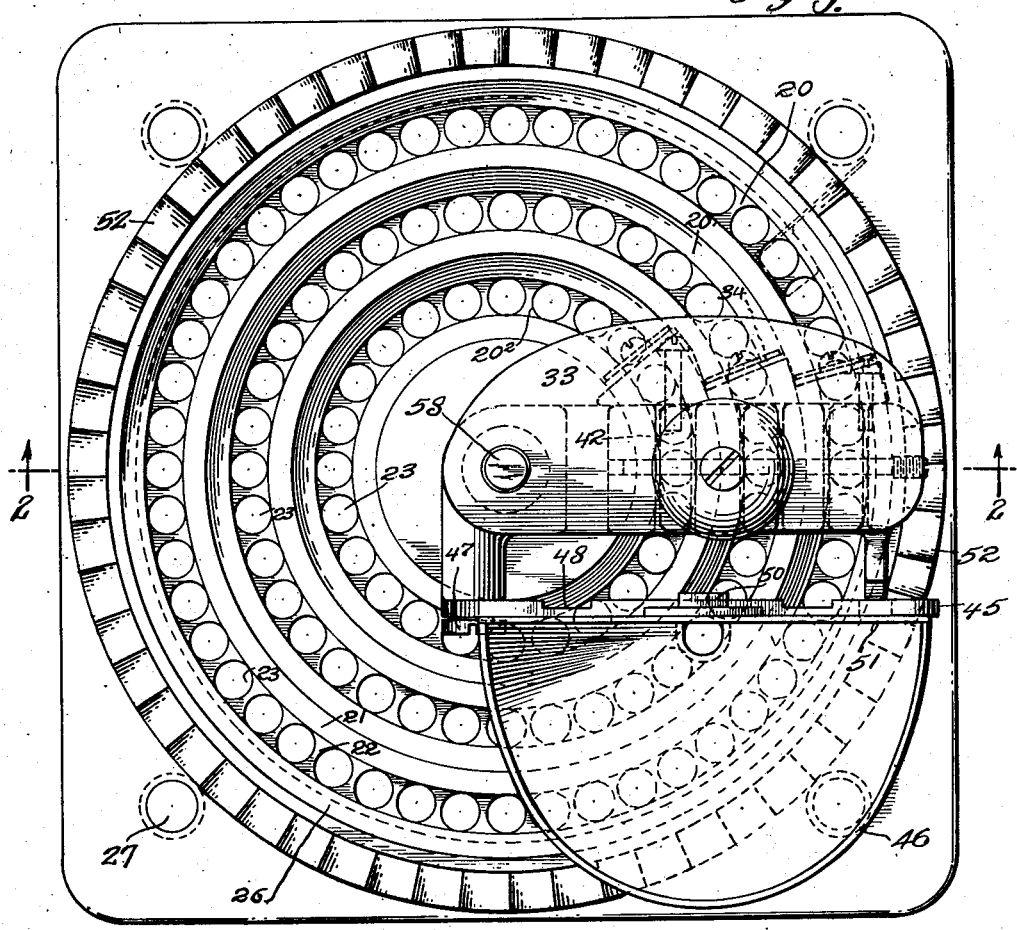
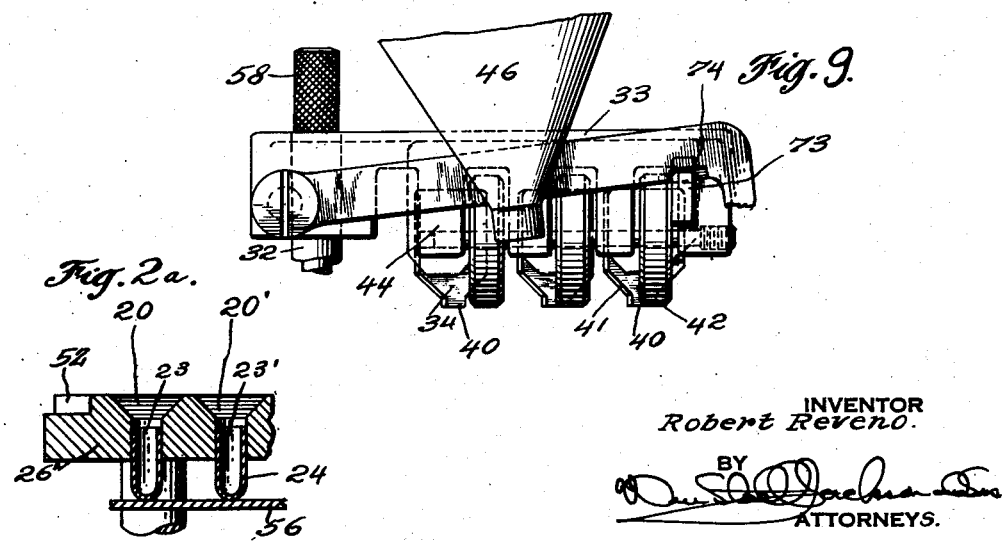
INVENTOR
Robert Reveno.
BY
ATTORNEYS.

July 28, 1953 R. REVENO 2,646,912
APPARATUS FOR AND METHOD OF FILLING CAPSULES
Filed March 23, 1950 3 Sheets-Sheet 3
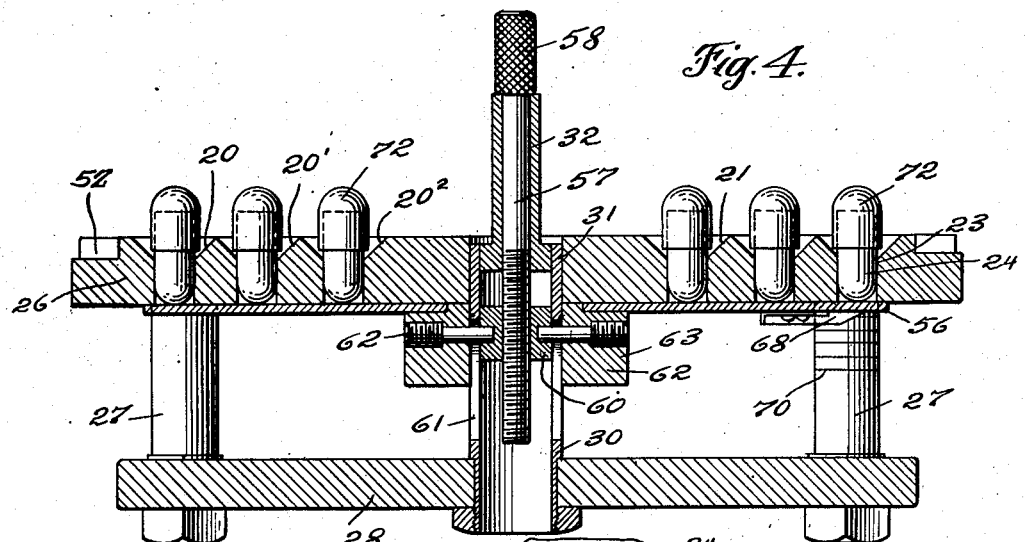
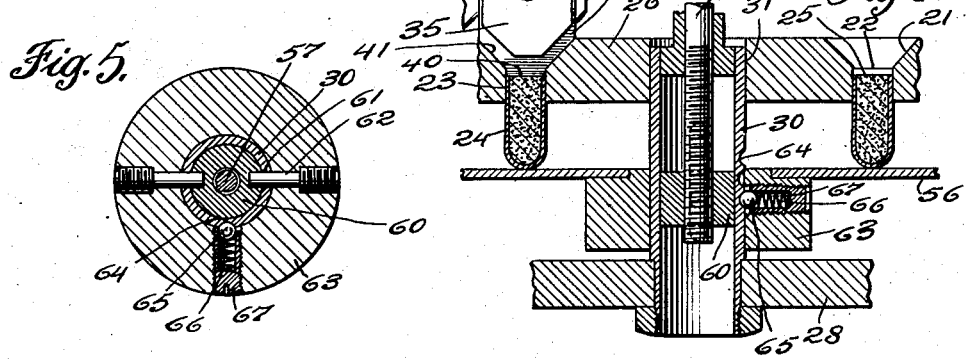
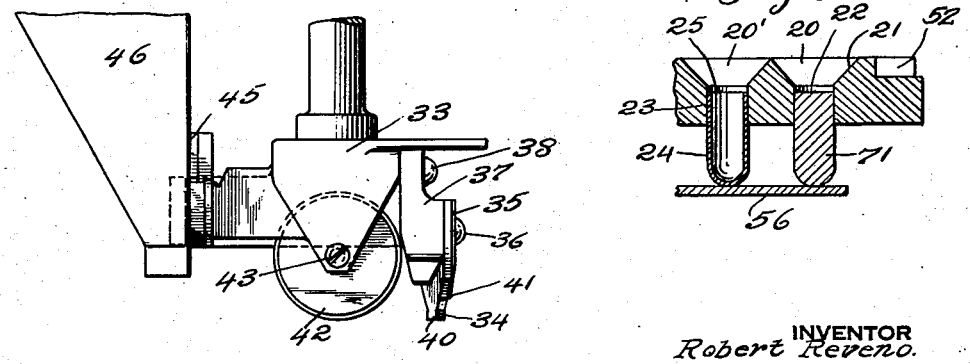
INVENTOR
Robert Reveno.
BY
ATTORNEYS.

Patented July 28, 1953

2,646,912

UNITED STATES PATENT OFFICE 2,646,912

APPARATUS FOR AND METHOD OF FILLING CAPSULES

Robert Reveno, Philadelphia, Pa.

Application March 23, 1950, Serial No. 151,329

9 Claims. (Cl. 226—40)

1

The present invention relates to capsule filling machines of the type suitable for employment by pharmacists in filling individual prescriptions or making up moderate lots of prescriptions.

A purpose of the invention is to permit more accurate subdivision of the bulk powder of a prescription into aliquot portions.

A further purpose is to permit the individual pharmacist in filling a prescription for a customer or in making up moderate quantities of a locally popular prescription, to subdivide the bulk and fill the capsules in a shorter time and with less difficulty.

A further purpose is to minimize the hazard of error in filling moderate and small lots of capsules.

A further purpose is to distribute capsule halves to be filled around the bottom of a channel, to pour the powder into the channel progressively around the endless length of the channel and to sweep the powder in the channel round and round the channel until all capsules are filled with the required aliquot portion of the powder.

A further purpose is to adjust the sweeping pressure by the hand so that the channel will be swept clean.

A further purpose is to press the powder into the capsules by resilient rollers and to permit the operator to adjust the pressure on the rollers by the hand.

A further purpose is to insert dummy plugs at openings where capsules are not to be employed.

A further purpose is to vibrate a funnel moving above the channel by a vibrating lever and toothed track, so as to permit uniform feed of the powder from the funnel.

A further purpose is to permit employment of capsules of various sizes by providing a replacement plate and a platform supporting the bottoms of the capsules at adjustable heights, desirably determined by a screw cooperating with a nut and preferably also aided in accurate adjustment by a detent.

A further purpose is to raise the platform so as to expose the tops of the capsule halves above the channel to hold the capsules for capping.

Further purposes appear in the specification and in the claims.

In the drawings I have chosen to illustrate one only of the numerous embodiments in which my invention may appear, selecting the forms shown from the standpoints of convenience in illustration, satisfactory operation and clear demonstration of the principles involved.

Figure 1 is a front elevation of the capsule

2 filling machine of the invention, partially broken away to permit showing the vibrating lever and funnel.

Figure 2 is a vertical section of the device on the line 2—2 of Figure 3. Capsules are shown in place in the capsule openings or sockets.

Figure 2ª is a fragment of Figure 2 showing a different plate and platform setting for capsules of different sizes.

Figure 3 is a top plan of the device omitting the capsules.

Figure 4 is a section corresponding to Figure 2, omitting the arm and track and showing the platform raised to permit capping of the capsule halves.

Figure 5 is a plan section on the line 5—5 of Figure 2.

Figure 6 is a fragmentary axial sectional view looking from the right in Figure 1 and showing the detent for aiding in positioning the bottoms of the capsule halves and showing one of the wipers.

Figure 7 is a fragmentary end elevation of the rotating arm taken at the position 7—7 in Figure 1.

Figure 8 is a fragmentary axial sectional view through the plate indicating a dummy plug.

Figure 9 is a fragmentary front elevational view of the rotating parts with the funnel vibrating lever latched in non-vibration position.

Figure 1:
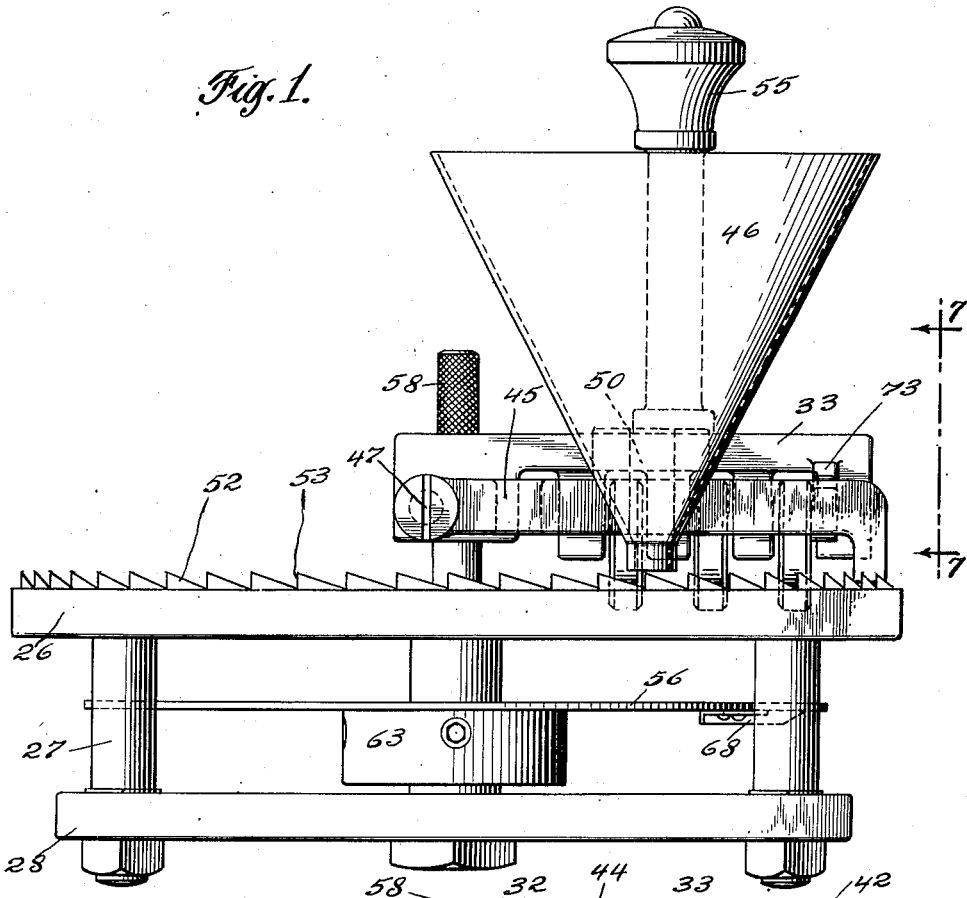

Describing in illustration but not in limitation and referring to the drawings:

In the prior art very complicated capsule filling machines are available to the pharmaceutical manufacturer, but at the present time there is not any practical device available to the pharmacist in an individual drugstore which permits dividing a powder into aliquot portions with high accuracy and filling them into capsules in a convenient and rapid manner, suitably to meet the short time requirements for supplying the individual customer and also to make up capsules of locally popular prescriptions such as those commonly prescribed by a physician practicing in the locality.

In accordance with the present invention, open capsule bottoms with their mouths upwardly directed are distributed around the bottom of an endless channel and the powder to be divided and filled into the capsules is fed to the channel progressively and endlessly round and round the channel until all powder has been discharged into the channel, at the same time wiping or sweeping the powder around the channel and into the mouths of the capsules.

Tamping or compressing action is desirably applied to the powder in the channel to break up any agglomerates of powder and force the powder into the capsule half.

Any points around the circumference where capsules are absent are desirably filled with dummy plugs.

The powder is conveniently fed from a funnel which is vibrated by motion of a funnel vibrating lever which traverses a toothed track.

The wiping and compressing action can be adjusted by adjusting the pressure of the hand on the handle which turns the wiper, compressor and funnel.

Various sizes of capsules can be accommodated by adjusting a bottom platform and suitably providing a plate with holes of the required sizes.

The capsules can be held in the holes or sockets of the channel for capping purposes, simply moving the platform up toward the bottom of the channel supporting plate to expose the upper ends of the capsules for capping.

The machine illustrated in the drawings has three endless circular upwardly directed channels 20, 20' and 20², each provided with sloping side walls 21 and flat bottom walls 22 and having at desirably equally circumferentially spaced points around the circumference a multitude of bottom holes or sockets 23 which receive and suitably closely fit capsule halves 24. The capsules are normally below the bottoms of the channels at 25. The channels are provided in one of a suitable series of plates 26 which is removably supported by standards 27 from a base 28. The standards suitably socket in the plate.

In the actual construction shown, there are three concentric channels illustrated, but it will be understood that any desired number of channels may be employed.

In the actual construction shown in most of the views, the capsule halves are all indicated as being of a particular size. This is not necessarily the case, and Figure 2ᵃ illustrates a fragmentary variation of Figure 2 in which a substitute plate 26' has sockets 23' in the channels to receive capsule halves of different size. It will, of course, be evident that for capsules of different size the platform will be conveniently adjusted as later explained.

It will be evident that each of the channels 23 extends endlessly around the device, so that the path provided by the channel can spread the powder round and round the channel.

Secured to the base 28 at the axis is an upstanding sleeve 30 extending through an opening 31 in the plate 26, and the sleeve at its upper end carries a central hollow stationary pivotal shaft 32 extending above the plate 26. The shaft 32 provides a vertical axial pivot for arm 33 which extends radially of the plate and above the channel. Mounted on the arm 33 in radially disposed positions corresponding to the positions of the respective channels are resilient wipers 34 (one for each channel) suitably of soft rubber or synthetic rubber, and held in place against the arm by metallic clips 35 held by screws 36. The screws 36 extend into brackets 37 (Figure 7) secured to the arm 33 by screws 38.

It will be noted that the wipers 34 have lower tongues 40 adapted to ride the bottoms of the channels and diagonal side portions 41 which engage the sloping walls 21 of the channels. The tongues 40 extend over and protrude slightly into the holes or sockets which receive the capsule halves.

Figure 2:
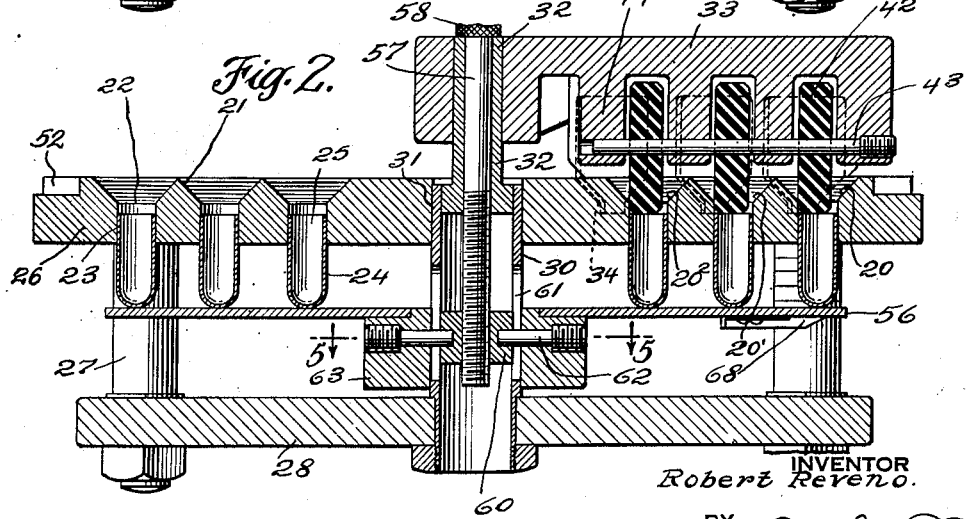

Also mounted on the arm 33 forwardly of the wipers in the direction of motion are radially pivoted resilient rollers 42 best seen in Figures 2 and 9, the rollers being suitably of soft rubber or synthetic rubber. The rollers pivot on a shaft 43 extending radially through projections 44 on the bottom of the arm.

Pivoted on the arm 33 on a horizontal axis near the center is a funnel vibrating lever 45 which supports a funnel 46 as best seen in Figures 1 and 3. The lever is pivoted on a screw 47 secured to the arm 33. The lever has a series of vertical slots 48 (Figure 3) at positions corresponding to the positions of the channels and fingers 50 on a flat side 51 of the funnel fit selectively into any one of the slots engaging the two sides of the lever and positioning the bottom of the funnel in cooperation with any one of the channels desired.

The outer circumference of the lever 45 normally rests upon and is vibrated by a toothed track 52 which surrounds the channels and may to advantage be formed in the plate 26. The teeth are desirably ratchet teeth abrupt at 53 in one direction, thus automatically preventing the possibility that the device might be turned in the wrong direction when the vibrating lever is engaging the track, as the abrupt edges 53 of the teeth stop that.

The arm 33 is provided with a handle 55 at a suitable distance from the center, the handle serving to turn the funnel, wipers and rollers and also permitting the user to apply adjustable pressure on the same to vary the wiping or sweeping action and the compressing action.

The positions of the mouths of the capsule halves are rendered adjustable by a platform 56 located beneath the plate 26 and extending under all of the sockets or holes 23. The platform is adjusted in vertical position by a screw 57 having a knurled handle 58 accessible to the user extending through the hollow of shaft 32 and making threaded engagement with a nut 59 inside sleeve 30. The sleeve has suitable diametrally opposite slots 61 extending vertically, through which pins 62 extend to engage the nut at the inner end and to engage a flange 63 at the outer end which is secured to the platform 56.

At suitable distances along the sleeve at positions circumferentially displaced from the slots 61, a series of detent recesses 64 are provided (Figures 5 and 6) which are engaged by a ball 65 urged by a compression spring 66 held in place by a follower screw 67. When the detent engages in one of the notches as the adjusting screw 57 is adjusted, a clicking noise and the change in resistance to turning of the screw advise the user that a predetermined level corresponding to a standard size of capsule has been reached.

If more accurate adjustment is desired, this can be obtained by an index 68 on the platform which alines with the index marks 70 on one of the uprights 27.

When the number of capsules to be filled does not correspond to those which complete one of the channels, any holes or sockets 23 unfilled by capsule halves are desirably filled with plugs 71, suitably of rubber or synthetic rubber, as shown in Figure 8.

After the capsules are completely filled, the platform can be raised to the upper limiting position as shown in Figure 4, in which case the upper ends of the capsules are exposed above the channels and thus held to aid the user in inserting, suitably by hand, upper capsule halves 72 to close the capsules. The capsules can be removed from the machine by inverting the plate.

In operation, the operator will determine which one of the channel plates will be used for a particular prescription by the size of capsules required. The arm with the wipers, rollers and funnel can desirably be lifted off bodily from the device during the changing of the channel plate and the insertion of the capsule halves, since it will slip over adjustment nut head 58. The channel to be used is determined by the number of capsules to be filled. The adjustment nut is adjusted until the platform is set at the proper height to support the bottoms of the capsule halves to be filled, at a position at which the mouths are below the bottoms of the channel which is to be used (Figures 2, 2ª, 6 and 8). The user then by hand inserts the capsule halves mouth up in the sockets 23 of the particular channel. When this has been completed the arm is restored to the device, and the funnel is adjusted in the correct one of the slots 48 so that its mouth discharges into the particular channel. The completed powdered prescription mass, consisting suitably of drugs or the like, is then inserted in the funnel and the operator proceeds preferably immediately to turn the handle 55 in the clockwise direction in Figure 3, pressing down with sufficient pressure to wipe the channel clean behind the wiper and to compress the powder adequately into the capsules and break up any agglomerates.

The toothed track vibrates the funnel up and down, shaking it and causing a very uniform discharge of powder from the mouth of the funnel. Much of the powder drops directly into the capsule bottoms as the arm turns, but any powder not dropping into the capsule halves is swept around the channel ahead of the wiper so that it will drop into a succeeding capsule half. In the meantime the roller in the particular channel is compressing the powder into the capsules and preventing accumulation of piles of powder at the mouths of the capsules. Due to the soft character of the wiper and roller, both enter the sockets 23 slightly if sufficient pressure is applied.

The funnel wipers and roller travel round and round the channel, dropping powder into the capsule bottoms, packing the powder down in the capsule bottoms and sweeping any powder not dropped into the capsule bottoms ahead of the wiper to be dropped in subsequent capsule bottoms.

When the funnel is emptied there usually is a remaining quantity of powder in the channel. The user may then eliminate the drag caused by the vibrating lever on the funnel by latching the funnel lever in upper position against latch 73 as best seen in Figure 9. The latch engages a notched portion 74 on the lever when the lever is sprung up past the latch.

The user then continues turning the device round and round until the last of the powder has entered the capsule bottoms.

The user next manipulates screw 58 until the platform reaches its upper limiting position as shown in Figure 4 exposing the upper ends of the lower capsule halves 24 to permit hand application of capsule closures 72. The arm with the wipers, rollers and funnel is desirably removed during this capping.

Dummy plugs, if any, are then taken out and the plate can be turned upside down to allow the capsules to drop out and be collected for packaging.

The machine is now ready for cleaning prior to use on the next prescription.

On a subsequent prescription the operation will normally be the same except that if a different size of capsules is to be used the platform will be raised or lowered to a different height for the different size of capsules, and a different plate will be used.

It will be evident that by the invention the path travelled by the funnel, roller and wiper is not limited to a portion of the circumference or a mere circumference, but extends indefinitely until the entire charge has been deposited in the capsule bottoms, thus assuring uniform distribution. It is, of course, desirable to have the machine turned at a reasonably uniform rate. I find, however, that for ordinary purposes it is not necessary to drive the machine by mechanism, a careful person being able to maintain a suitably uniform drive by hand, and the hand drive having the advantage that the operator can adjust the pressure to be applied on the wiper and roller.

It will be evident that the capsules used may be of gelatine or other suitable material.

In view of my invention and disclosure variations and modifications to meet individual whim or particular need will doubtless become evident to others skilled in the art, to obtain all or part of the benefits of my invention without copying the structure and process shown, and I, therefore, claim all such insofar as they fall within the reasonable spirit and scope of my claims.

Having thus described my invention what I claim as new and desire to secure by Letters Patent is:

1. In a capsule filling machine, walls forming an endless circular upwardly directed channel having sockets distributed around the channel into which capsule halves fit, a wiper arm pivoted adjacent the center of the channel, a wiper of resilient material on the wiper arm riding the channel in contact therewith above the tops of the capsules and a cylindrical resilient roller rotatably mounted on the wiper arm ahead of the wiper in the direction of motion and continuously engaging the bottom of the channel during circular motion around the channel.

2. In a capsule filler, walls forming an endless circular upwardly directed channel having sockets distributed around the bottom of the channel and adapted to receive capsule halves resting in the sockets, a central upstanding pivotal shaft, a wiper arm pivoting on the shaft, movable axially of the pivot and extending over the channel, a wiper of resilient material on the arm engaging the bottom and sides of the channel, a handle on the arm adapted to turn the same and to apply pressure on the arm in engaging the bottom and side walls of the channel and a cylindrical roller of resilient material rotatably mounted on the arm in a position ahead of the wiper in the direction of motion and engaging the bottom of the channel.

3. In a capsule filling machine, walls forming an upwardly directed endless circular channel having a plurality of openings distributed around the bottom of the channel, and each adapted to receive an upwardly directed open capsule half, a platform beneath the channel and adapted to engage the bottoms of the capsule halves, a central sleeve having radial slots, a nut in the sleeve, an upwardly extending screw cooperating with the nut, pins extending through the slots in the sleeve, engaging the nut at one end and the platform at the other end, a hollow shaft surrounding the screw, an arm pivoting on the shaft, axially movable with respect to the shaft and extending outwardly over the channel, there being notches in the sleeve, a detent on the platform cooperating with the notches in the sleeve, and a resilient wiper secured to the arm and engaging the bottom and side walls of the channel.

4. In a capsule filling machine, walls forming an upwardly directed endless circular channel having a plurality of openings distributed around the bottom of the channel, and each adapted to receive an upwardly directed open capsule half, a platform beneath the channel and adapted to engage the bottoms of the capsule halves, a central sleeve having radial slots, a nut in the sleeve, an upwardly extending screw cooperating with the nut, pins extending through the slots in the sleeve, engaging the nut at one end and the platform at the other end, a hollow shaft surrounding the screw, an arm pivoting on the shaft, axially movable with respect to the shaft and extending outwardly over the channel, there being notches in the sleeve, a detent on the platform cooperating with the notches in the sleeve, a resilient wiper secured to the arm and engaging the bottom and side walls of the channel, and a resilient roller mounted on the arm in advance of the wiper in the direction of motion and engaging the bottom of the channel.

5. In a capsule filling machine, walls forming an upwardly directed circular channel having a plurality of openings around the bottom of the channel each adapted to receive a capsule half with the mouth upwardly directed, an upwardly directed pivotal shaft at the center of the channel, an arm pivoting on the shaft and extending over the channel, a toothed track surrounding the channel, a vibrating lever pivoting on the arm near its inner end and adapted to engage the toothed track near its outer end, a funnel mounted on the vibrating lever in position above the channel and a wiper secured to the arm, engaging the bottom and side walls of the channel and located behind the funnel in the direction of motion of the arm and vibrating lever.

6. In a capsule filling machine, walls forming an upwardly directed circular channel having a plurality of openings around the bottom of the channel each adapted to receive a capsule half with the mouth upwardly directed, an upwardly directed pivotal shaft at the center of the channel, an arm pivoting on the shaft and extending over the channel, a toothed track surrounding the channel, a vibrating lever pivoting on the arm near its inner end and adapted to engage the toothed track near its outer end, a funnel mounted on the vibrating lever in position above the channel, a wiper secured to the arm, engaging the bottom and side walls of the channel and located behind the funnel in the direction of motion of the arm and vibrating lever, and a resilient roller secured to the arm and engaging the bottom of the channel behind the funnel and ahead of the wiper.

7. In a capsule filler, walls forming an upwardly directed endless circular channel having a plurality of openings around the bottom adapted to receive capsule halves with the mouths upwardly directed, a platform below the channel adapted to engage the bottoms of the capsule halves, a nut on the platform, a screw cooperating with the nut to raise and lower the platform, a central pivot shaft upwardly extending above the channel, an arm pivoting on the shaft, outwardly extending over the channel and movable axially on the shaft, a handle on the arm, a toothed track surrounding the channel, a vibrating lever pivoting on the arm near the center and engaging the toothed track at its outer end, a funnel mounted on the vibrating lever in position above the channel, a latch on the arm adapted to engage the vibrating lever and hold it in position above the toothed track, a resilient roller pivoted on the arm behind the funnel in the direction of motion and engaging the bottom of the channel and a resilient wiper mounted on the arm behind the roller in the direction of motion and engaging the bottom and sides of the channel.

8. The process of dividing a definite quantity of powder into aliquot portions and filling the same into capsules, which comprises distributing capsule halves substantially adequate in volume to receive the whole quantity of powder in holes in vertical position with the mouths directed upwardly around the bottom of an endless channel, dropping powder into the channel in a progressively advancing stream at progressively advancing points endlessly around the channel, compressing the powder into the holes and into the channel halves with any excess in the holes above the capsule halves and sweeping powder endlessly around and around the channel until it is all deposited in the holes and the capsule halves.

9. The method of dividing a definite quantity of powder into aliquot portions and filling the same into capsules, which comprises distributing capsule halves having a capacity substantially adequate to receive all of the definite quantity of powder in holes in vertical position with the mouths directed upwardly around the bottom of an endless circular channel, dropping the powder from above into the channel in a stream advancing around the complete circumference of the channel, compressing the powder into the holes and into the capsule halves with any excess beyond the capacity of the capsule halves extending above the top of the capsule halves, sweeping powder endlessly around and around the channel until it is all deposited into the holes and into the capsule halves, raising all of the capsule halves to an elevated position in which the capsule halves stick out above the channel and inserting capsule closure on the capsule halves in elevated position.

ROBERT REVENO.

References Cited in the file of this patent

UNITED STATES PATENTS

| Number | Name | Date |
|---|---|---|
| 479,812 | Johnston | Aug. 2, 1892 |
| 566,098 | Schindler | Aug. 18, 1896 |
| 939,455 | Thom | Nov. 9, 1909 |
| 1,161,276 | Abbey et al. | Nov. 23, 1915 |
| 1,371,264 | Rittenbry | Mar. 15, 1921 |
| 2,092,051 | Contant | Sept. 7, 1937 |
| 2,526,965 | Nordman | Oct. 24, 1950 |
| 2,546,300 | Fritts | Mar. 27, 1951 |